April 4, 1939.   M. ZAIGER   2,153,225
CLIP FOR WINDSHIELD WIPERS
Filed April 24, 1935
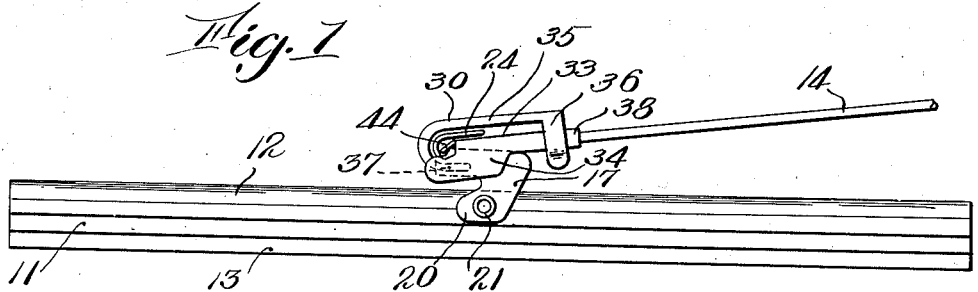
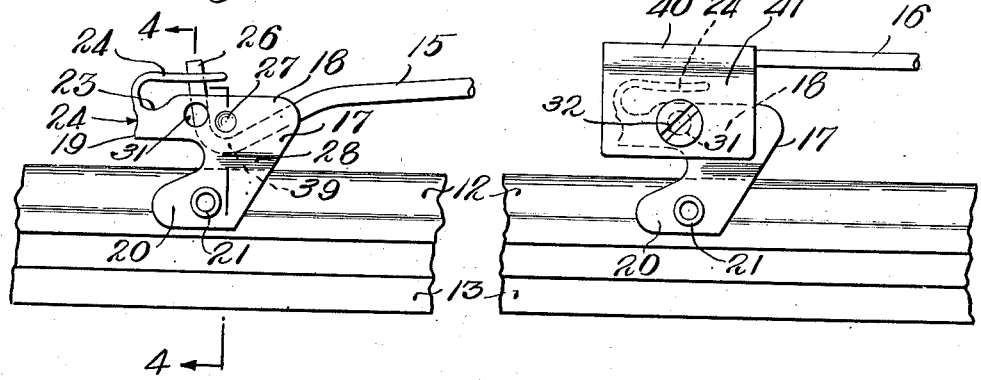
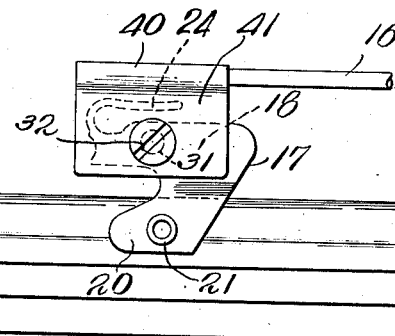
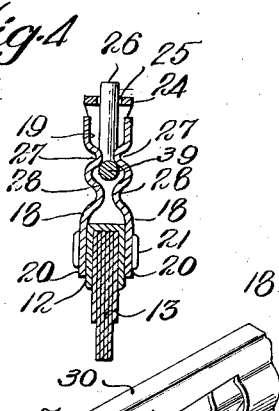
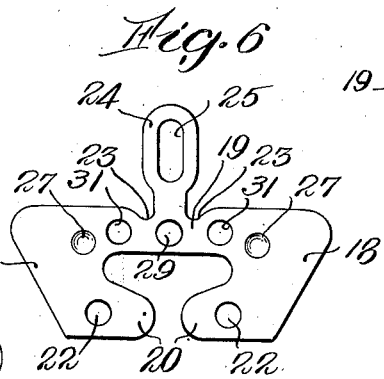
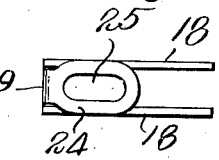
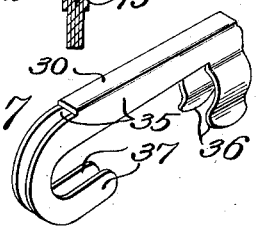
Inventor
Max Zaiger
by Thomson & Thomson
his Attys.

Patented Apr. 4, 1939

2,153,225

UNITED STATES PATENT OFFICE 2,153,225

CLIP FOR WINDSHIELD WIPERS

Max Zaiger, Swampscott, Mass.

Application April 24, 1935, Serial No. 17,935

2 Claims. (Cl. 15—250)

This invention relates to windshield wipers, and pertains more particularly to devices, commonly called "clips", for connecting the wiper blade to the wiper arm; and this application is a continuation in part of my pending application Serial No. 759,943, filed December 31, 1934, for Windshield wipers.

The principal purpose of this invention is to provide a simple, inexpensive and efficient connecting clip which may be satisfactorily employed with either of the three common forms of wiper arms, usually known as the "hook type", "slotted type" and "screw type", respectively.

Another object is to provide a detachable clamp which is preferably associated with the improved clip for securing the slotted type arm thereto; and other features of this invention will be apparent from the following description of the recommended embodiments illustrated in the accompanying drawing, and will be pointed out in the appended claims.

In the drawing,

Fig. 1 is a side elevation of the improved clip attached to an ordinary wiper blade and connected to a wiper arm of the slotted type;

Figs. 2 and 3 are similar views, partly broken away, showing the clip as connected to wiper arms of the hook and screw types, respectively;

Fig. 4 is a section on line 4—4 of Fig. 2;

Fig. 5 is a plan view of the clip shown in Figs. 1 to 4;

Fig. 6 is a view of a metal blank from which this clip is made; and

Fig. 7 is a perspective view partly broken away, of the clamp or guard shown in Fig. 1.

The wiper blade 11 may be of any common or suitable construction comprising, as usual, a metal channel strip or holder 12 and one or more wiping strips 13 of soft rubber, which are embraced by the holder and arranged to be brushed or wiped over the windshield of an automobile.

The wiper arms 14, 15 and 16 are also of ordinary construction, as represented by the three types illustrated in Figs. 1 to 3, respectively; and are adapted to be manipulated by an electric or pneumatic motor (not shown) to move the wiper blades in accordance with common practice.

The clip 17 which constitutes the principal subject matter of this invention serves to attach any one of these wiper arms to the wiper blade 11. In the particular form chosen for the purpose of illustration, this clip is made from sheet metal stamped out in the form of the blank shown in Fig. 6; and comprises two spaced side portions 18 of similar conformation, integrally connected at one end by the cross piece or bridge 19, and having depending tabs or ears 20 adapted to straddle the holder 12 and to be attached thereto by a tubular rivet 21 or other fastening which is passed through openings 22 in said ears and through the holder and rubber strips 13.

The clip is formed with notches 23 at the upper edge of its side portions 18, adjacent the bridge 19, and said bridge has an integral extension or finger 24 which is bent rearwardly to overlie the upper edges of the sides 18 in spaced relation thereto. This finger has an opening 25 for receiving the end 26 of the hook type wiper arm (Figs. 2 and 4); and the sides of the clip are deformed to provide inward projections or detents 27 under which the bend or shank of the hooked arm 15 is engaged when attached to the clip. The detents 27 thus cooperate with inwardly bent ribs 28, spaced below said detents, to hold the arm 15 in proper position within the clip.

The end wall or bridge 19 of the clip preferably has an opening 29 which receives the hook of the clamp or guard member 30 (hereinafter more fully described) which is preferably employed with the slotted type wiper arm (Fig. 1); and the sides 18 of the clip are preferably formed with additional apertures 31 through which a screw or bolt 32 may be inserted to secure the end of the screw type arm (Fig. 3).

The slotted type wiper arm 14 has an end portion or attaching member 33 of U-shaped cross section, providing depending sides or ears 34 spaced apart sufficiently to straddle the side portions 18 of the clip when said end 33 is applied to the clip beneath the overhanging finger 24, as shown in Fig. 1. Wiper end 33 also has a short tab 44 bent downwardly from the forward end of its top wall to engage the notches 23 adjacent the bridge 19 of the clip. Thus, the wiper arm 15 is connected to the clip by sliding its U-shaped end 33 under the finger 24 and over the sides 18 which are frictionally embraced by the ears 34, until the tab 44 is received by the notches 23. (The top of the attaching member 33 usually has a slot which is adapted to receive a projection of another type of clip and which explains the common designation of this type of wiper arm; but this slot has no function in connection with the clip herein described, and is not shown in the drawing.)

In order to secure this connection between the clip and the slotted type arm, against accidental separation, I preferably employ the removable locking clamp or guard 30. This clamp may be made of sheet metal bent into U-shaped cross-section to provide parallel sides 35 which are formed with depending spring clips 36 at the rearward end of the clamp and spaced hook members or fingers 37 at the front end thereof. The hooks 37 are inserted through the aperture 29 in the bridge 19 of the clip, and the spring clips 36 are then snapped over the tubular portion 38 of the arm 33, thereby to engage the wiper arm and releasably hold it in attached position (Fig. 1). The bottom edges of the hooks 37 and sides 35 closely overlie the top surface of fingers 24 in said connected position.

The hook type wiper arm 15 commonly consists of a round wire or rod having the L-shaped end or hook 26, as shown in Figs. 2 and 4. This arm is connected to the clip by inserting its tip end upwardly through the opening or slot 25 in the finger 24, and then snapping the bend or elbow 39 of the hook between and beneath the projecting detents or studs 27 on the clip sides 18, so that the L-shaped end is removably secured between said sides and above the ribs 28. The studs 27 and ribs 28 thus prevent displacement of the rod or arm in an upward or downward direction (as shown in the drawing), while the engagement of the tip end within opening 25 restrains endwise movement of the arm. Hence no supplemental clamp or guard is necessary to secure this attachment.

The screw type wiper arm 16 has a U-shaped attaching member 40 secured to the end of its rod and formed with side members 41 which straddle and embrace the clip when applied thereto as shown in Fig. 3. The rod or arm 16 may rest upon the finger 24; and the member 40 is secured by a screw or bolt 32 passing through openings in the clip sides 18 and in the sides of member 40.

It is thus apparent that the clip 17 herein shown and described is adapted for attachment to a wiper blade and to either of the three types of wiper arms above indicated; and that it has special structural features which are particularly efficacious in connecting the slotted type and hook type arms, respectively. It will be understood, however, that the structural details of this clip may be varied to suit particular purposes without departing from the essence of this invention as defined in the following claims. For example, the pivotal connection between the forward end of the clamp 30 and the bridge 19 may be achieved in several known or obvious ways which permit these parts to be separably attached at that point by cooperating means thereon, while permitting the rearward portion of the clamp to be swung downwardly until its resilient fingers or spring clips 36 yieldingly engage the U-shaped attaching member of the wiper arm.

I claim:

1. A clip for windshield wipers, comprising spaced side portions having depending ears for fastening the clip to a wiper blade, a bridge member connecting said side portions at one end of the clip, and a finger extending from said bridge and overlying the top edges of said side portions, the sides of the clip being constructed and arranged to fit between the side flanges of a wiper arm having a U-shaped attaching member, or to receive therebetween the L-shaped end of a hook type wiper arm, said finger having an opening for receiving the tip of said L-shaped end, and said side portions having inwardly projecting detents beneath which the bend of said L-shaped end may be snapped to secure said end within the clip.

2. A fastening for connecting a wiper blade to a slotted type wiper arm having a U-shaped attaching member, said fastening comprising a clip having spaced side portions adapted to fit within said member and provided with ears adapted to straddle the blade, an integral bridge connecting said side portions at one end of the clip and having a finger extending upwardly and rearwardly therefrom to overlie the top edges of the side portions, the bridge also having an opening therethrough, and a separable clamp having a hook portion insertable in said opening and spring clips engageable with said U-shaped attaching member to secure it to the clip when it is applied beneath said finger, the clamp extending rearwardly and closely overlying said finger and the spring clips straddling said attaching member when the wiper arm is in connected position.

MAX ZAIGER.